(12) United States Patent
Chen et al.

(10) Patent No.: US 11,113,706 B2
(45) Date of Patent: Sep. 7, 2021

(54) SCORING INFORMATION MATCHING METHOD AND DEVICE, STORAGE MEDIUM AND SERVER

(71) Applicant: PING AN TECHNOLOGY (SHENZHEN) CO., LTD., Guangdong (CN)

(72) Inventors: Bin Chen, Shenzhen (CN); Xinyu Zhang, Shenzhen (CN); Wei Wang, Shenzhen (CN); Pingmei Li, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 569 days.

(21) Appl. No.: 16/076,583

(22) PCT Filed: Jun. 26, 2017

(86) PCT No.: PCT/CN2017/090049
§ 371 (c)(1),
(2) Date: Aug. 8, 2018

(87) PCT Pub. No.: WO2018/149079
PCT Pub. Date: Aug. 23, 2018

(65) Prior Publication Data
US 2021/0174382 A1    Jun. 10, 2021

(30) Foreign Application Priority Data
Feb. 16, 2017  (CN) .......................... 201710083457.7

(51) Int. Cl.
*G06Q 30/02*      (2012.01)
*G06Q 30/00*      (2012.01)
(Continued)

(52) U.S. Cl.
CPC ....... *G06Q 30/0203* (2013.01); *G06Q 30/016* (2013.01); *H04M 3/42382* (2013.01); *H04M 3/5175* (2013.01); *H04M 2203/651* (2013.01)

(58) Field of Classification Search
USPC ...................................................... 705/7.32
See application file for complete search history.

(56) References Cited

U.S. PATENT DOCUMENTS

| 6,724,887 | B1 * | 4/2004 | Eilbacher | H04M 3/5183 |
| | | | | 379/265.02 |
| 2005/0147228 | A1 * | 7/2005 | Perrella | H04M 3/5183 |
| | | | | 379/265.06 |

(Continued)

FOREIGN PATENT DOCUMENTS

| CN | 101150633 A | 3/2008 |
| CN | 101408966 A | 4/2009 |

(Continued)

OTHER PUBLICATIONS

First Office Action and translation for counterpart Chinese Patent Application No. 201710083457.7, dated Nov. 14, 2018.

(Continued)

*Primary Examiner* — Harry S Hong
(74) *Attorney, Agent, or Firm* — Michael F. Fedrick; Loza & Loza, LLP

(57) ABSTRACT

Scoring information matching method and device, storage device and server. This scoring information matching method comprises: obtaining a target scoring information and a target scoring message which corresponds to the target scoring information; obtaining a first telephone number which sends out the target scoring message; obtaining the second telephone number which sends out the target scoring information; extracting a first identity number from the first telephone number; searching in preset service records for a service record of which an identity number is the same as the (Continued)

first identity number, a telephone number of a recipient of a corresponding scoring message is the same as the second telephone number, and a transmission time of the corresponding scoring message satisfies a preset condition; and determining the searched service record as a target service record that matches with the target scoring information.

15 Claims, 7 Drawing Sheets

(51) Int. Cl.
*H04M 3/51* (2006.01)
*H04M 3/42* (2006.01)

(56) References Cited

U.S. PATENT DOCUMENTS

| | | | |
|---|---|---|---|
| 2010/0332287 A1 | 12/2010 | Gates et al. | |
| 2014/0171034 A1 | 6/2014 | Aleksin et al. | |
| 2014/0229238 A1 | 8/2014 | Meyer et al. | |
| 2017/0011408 A1 | 1/2017 | Ravishankar et al. | |

FOREIGN PATENT DOCUMENTS

| | | | |
|---|---|---|---|
| CN | 101730016 A | 6/2010 |
| CN | 102368853 A | 3/2012 |
| CN | 102693492 A | 9/2012 |
| CN | 103188100 A | 7/2013 |
| CN | 103258274 A | 8/2013 |
| CN | 104408075 A | 3/2015 |
| KR | 20080086099 A | 9/2008 |
| WO | 2015121832 A1 | 8/2015 |

OTHER PUBLICATIONS

Supplementary European Search Report for corresponding EP Application No. 17847749 dated Sep. 23, 2020, 8 pgs.
First Office Action for corresponding Australian Patent Application No. 2017329095, dated Mar. 25, 2019, 6 pages.

* cited by examiner

SCORING INFORMATION MATCHING METHOD AND DEVICE, STORAGE MEDIUM AND SERVER

CROSS-REFERENCE TO RELATED APPLICATIONS

This application is the U.S. national stage of International Patent Application No. PCT/CN2017/090049, filed on Jun. 26, 2017 and entitled SCORING INFORMATION MATCHING METHOD AND DEVICE, STORAGE MEDIUM AND SERVER, which claims the benefit of priority under 35 U.S.C. § 119 from Chinese Patent Application No. 201710083457.7, filed Feb. 16, 2017. The disclosures of the foregoing applications are incorporated herein by reference in their entirety.

TECHNICAL FIELD

The present application relates to the field of financial services, and particularly relates to scoring information matching method and device, storage medium, and server.

BACKGROUND

In order to monitor and improve service qualities of enterprises, scoring messages are used by more and more enterprises as important customer feedback means. After a service staff of an enterprise has provided a customer with human service, a system of the enterprise will record a service record of the current human service, and trigger a transmission request of a scoring message, a scoring message will be sent to a mobile phone of the customer over a telecom operator in a predetermined manner. The customer can reply scoring information to the scoring message, and the replied scoring information is matched with the service record in the system, such that the enterprise can obtain the customer feedback of the human service provided by the service staff currently.

At present, generally, before the scoring message is transmitted, an identity number of the service record is embedded into a number which sends out the scoring message, and the scoring message is sent through the number which sends out the scoring message. When the customer replies the scoring information, the system searches the corresponding service record through the identity number embedded into the number which sends the scoring message, thereby accomplishing matching of the scoring information and the service record.

However, since the length of the number which sends the scoring message is restrained strictly by the telecom operator, such that a limited length of the embeddable identity number is incurred. Therefore, when a large amount of scoring messages are sent out in short time, a mobile phone of the same customer may receive scoring messages from the same number, such that the condition of mismatch of service records in replied scoring information and system is caused, and the accuracy of enterprise service quality surveillance is reduced.

Technical Problem

Embodiments of the present application provide a scoring information matching method and device, a storage medium and a server, which can prevent the condition of mismatch of service records in replied scoring information and system from occurring, thereby improving the accuracy of enterprise service quality surveillance.

Technical Solution

Scoring information matching method provided by an embodiment of the present application comprises:
obtaining target scoring information and target scoring message which corresponds to the target scoring information;
obtaining a first telephone number which sends out the target scoring message;
obtaining the second telephone number which sends out the target scoring information;
extracting a first identity number from the first telephone number;
searching for a service record of which an identity number is the same as the first identity number, a telephone number of a recipient of a corresponding scoring message is the same as the second telephone number, and a transmission time of the corresponding scoring message satisfies a preset condition in preset service records; and
determining the searched service record as a target service record that matches with the target scoring information.

Scoring information matching device provided by one embodiment of the present application comprises:
a scoring information message obtaining module configured to obtain target scoring information and target scoring message which corresponds to the target scoring information;
a first number obtaining module configured to obtain a first telephone number which sends out the target scoring message;
a second number obtaining module configured to obtain the second telephone number which sends out the target scoring information;
a first identifier number obtaining module configured to extract a first identity number from the first telephone number;
a service record searching module configured to search for a service record of which an identity number is the same as the first identity number, a telephone number of a recipient of a corresponding scoring message is the same as the second telephone number, and a transmission time of the corresponding scoring message satisfies a preset condition in preset service records; and
a matching module configured to determine the searched service record as a target service record that matches with the target scoring information.

A server provided by another embodiment of the present application comprises a storage device, a processor and computer program stored in the storage device and executable by the processor, the processor is configured to implement the steps in the aforesaid scoring information matching method when executing the computer program.

Another embodiment of the present application provides a computer readable storage medium, the computer readable storage medium stores computer program, when the computer program is executed by a processor, the steps in the aforesaid scoring information matching method are executed.

Advantageous Effects

It can be seen from the technical solutions described above that, embodiments of the present application have following advantages:

In this embodiment, firstly, the target scoring information and the target scoring message which corresponds to the target scoring information are obtained; then, the first telephone number which sends out the target scoring message is obtained; the second telephone number which sends out the target scoring information is obtained; afterwards, the first identity number in the first telephone number is extracted, and the service record of which the identity number is the same as the first identity number, and the telephone number of the recipient of the corresponding scoring message is the same as the second telephone number, and the transmission time of the corresponding scoring message meets the preset condition in the preset service records; lastly, the searched service record is determined as the target service record that matches with the target scoring information. In this embodiment, the service record meeting the preset condition is searched according to the identity number, the telephone number and the transmission time of the corresponding scoring message, even though a condition that a mobile phone of the same customer receives scoring messages from the same number occurs, the service record that matches with target scoring information can still be searched out accurately according to the transmission time of the corresponding scoring message, a condition of mismatch of service record in replied scoring information and system is prevented from occurring, and an accuracy of enterprise service quality surveillance is improved.

DETAILED DESCRIPTION OF THE PREFERRED EMBODIMENTS

The embodiments of the present application provide scoring information matching method and device, a storage medium and a server, which aim at solving a technical problem that a mismatch of service records is prone to occur in replied scoring information and system.

In order to make the purpose, technical features and advantages of the present application be more obvious and more understandable, technical solutions in the embodiments of the present application will be described clearly and comprehensively with reference to accompanying drawings in the embodiments, it is obvious that, the embodiments described below are merely part of the embodiments of the present application, but not the whole of the embodiments.

Based on the embodiments in the present application, some other embodiments, which are obtained by one of ordinary skill in the art at the premise of paying no creative labor, are all included in the protection scope of the present application.

Figure 1:
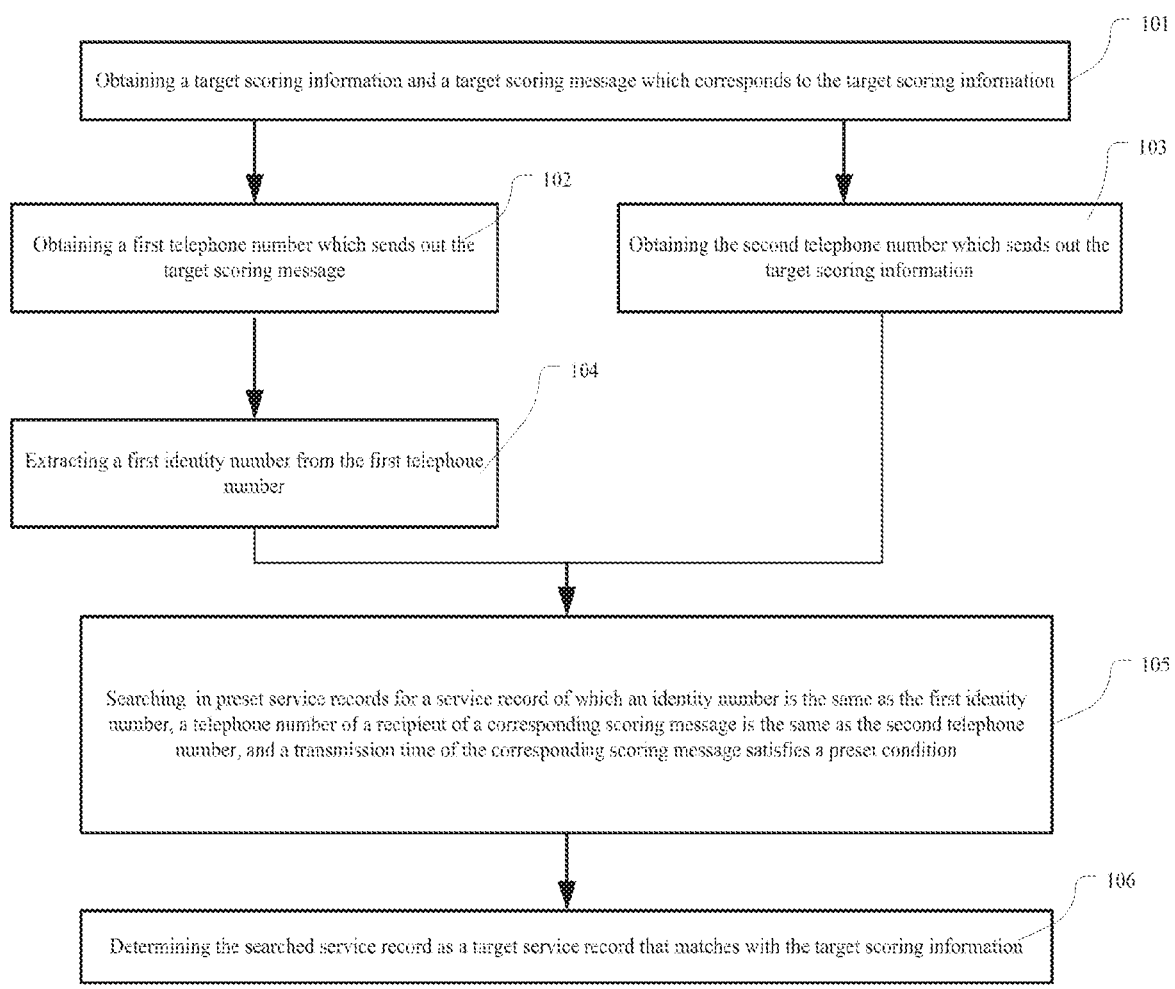
FIG. 1 illustrates a flow chart of a first embodiment of a scoring information matching method in one embodiment of the present application.

Please refer to FIG. 1, a first embodiment of a scoring information matching method in the embodiments of the present application comprises:

step 101, obtaining target scoring information and target scoring message which corresponds to the target scoring information;

in this embodiment, firstly, the target scoring information and the target scoring message which corresponds to the target scoring information are obtained.

The target scoring information can be scoring information which is replied by a customer in response to the target scoring information. It can be understood that, when the customer replies the message information in response to a scoring message, the scoring information will be sent back to a telephone number which transmits the scoring information; thus, a system can obtain the target scoring information and the corresponding target scoring message directly.

Step 102, obtaining a first telephone number which sends out the target scoring information;

after the target scoring message is obtained, the first telephone number which sends out the target scoring information can be obtained.

The aforesaid first telephone number is referred to as the telephone number which sends out the target scoring message. It can be understood that, these telephone numbers which send out scoring messages are set according to a predetermined rule. For example, supposing that an official number provided by a telecom operator to an enterprise is 22222, regarding the telephone number which sends out the scoring message actually, 3 identity numbers subsequent to the number 22222 can be added in order to distinguish business data or index service records; then, the telephone number segment which sends out the scoring message is 22222XXX. It can be known that, the number of 22222XXX can distinguish 1000 scoring messages simultaneously at most, when there are more than 1000 scoring messages, a condition that the same telephone number sends out more than two scoring messages will occur.

Step 103, obtaining a second telephone number which sends out the target scoring information;

after the target scoring information is obtained, the second telephone number which sends out the target scoring information can be obtained, the second telephone number is the telephone number of the customer which sends out the target scoring information.

Step 104, extracting a first identity number from the first telephone number;

after the first telephone number is obtained, the first identity number in the first telephone number can be extracted.

It can be understood that, before sending out the target scoring information, the first telephone number will embed an identity number of a service record into the first telephone number; for example, supposing that the telephone number which sends out the scoring information is 22222XXX, the last three digits "XXX" is a location where the identity number of the service record is embedded. After the identity number in the telephone number which sends out the scoring message is extracted, the corresponding service record can be searched according to the identity number.

In one embodiment, for facilitating searching of the service records, the last three digits of an ID number of a service record can be selected as the identity number of the service record.

Step 105, searching in preset service records for the service record of which an identity number is the same as the first identity number, and a telephone number of a recipient of the corresponding scoring message is the same as the second telephone number, and a transmission time of the corresponding scoring message meets a preset condition;

after the first identity number and the second telephone number are obtained, the service record of which the identity number is the same as the second telephone number, and the telephone number of the recipient of the corresponding scoring message is the same as the second telephone number, and the transmission time of the corresponding scoring message meets the preset condition is searched in the preset service records.

It can be understood that, since there is limited number of digits used for distinguishing business data or indexing identity number in the service record in the telephone number which sends out the scoring message, for example, supposing that the telephone number segment which sends out the scoring message is 22222XXX, this telephone number segment can distinguish 1000 scoring message simultaneously at most, when there are more than 1000 scoring messages, a condition that the same telephone number sends out more than two scoring messages will occur, thus, if the service record of which the identity number is the same as the first identity number, and the telephone number of the recipient of the corresponding scoring message is the same as the second telephone number is searched in the preset service records merely, more than two service records that meet the requirement may be obtained; at this time, a condition of matching the target scoring information with a wrong service record may occur.

In order to prevent the aforesaid condition of mismatch from occurring, the transmission time of the scoring message corresponding to the searched record still needs to meet the preset condition. The preset condition can be requiring the transmission time of the scoring message is in a certain time range such as between 1-2 days, since seeing from the number of the daily human services of an enterprise, no more than 1000 scoring messages are transmitted in 1-2 days generally, thus, there is a very low possibility of occurrence of transmitting a scoring message with repetitive scoring message number in 1-2 days, such that the condition of mismatch can be avoided from occurring. Particularly, in order to further reduce the possibility of mismatch, the time range can be set to be narrower such as in one hour.

Step 106, determining the searched service record as the target service record that matches with the target scoring information.

After searching for the service record of which an identity number is the same as the first identity number, and a telephone number of a recipient of the corresponding scoring message is the same as the second telephone number, and a transmission time of the corresponding scoring message meets the preset condition in preset service records, the searched service record can be determined as the target service record that matches with the target scoring information.

It can be understood that, after filtering according to search conditions of the aforesaid step 105, it can be considered that the searched service record is corresponding to and matches with the target scoring information solely, and thus can be determined as the target service record.

In this embodiment, firstly, the target scoring information and the target scoring message which corresponds to the target scoring information are obtained; then, the first telephone number which sends out the target scoring message is obtained; the second telephone number which sends out the target scoring information is obtained; afterwards, the first identity number in the first telephone number is extracted, and the service record of which the identity number is the same as the first identity number, and the telephone number of the recipient of the corresponding scoring message is the same as the second telephone number, and the transmission time of the corresponding scoring message meets the preset condition in the preset service records; lastly, the searched service record is determined as the target service record that matches with the target scoring information. In this embodiment, the service record meeting the preset condition is searched according to the identity number, the telephone number and the transmission time of the corresponding scoring message, even though a condition that a mobile phone of the same customer receives scoring messages from the same number occurs, the service record that matches with target scoring information can still be searched out accurately according to the transmission time of the corresponding scoring message, a condition of mismatch of service record in replied scoring information and system is prevented from occurring, and an accuracy of enterprise service quality surveillance is improved.

Figure 2:
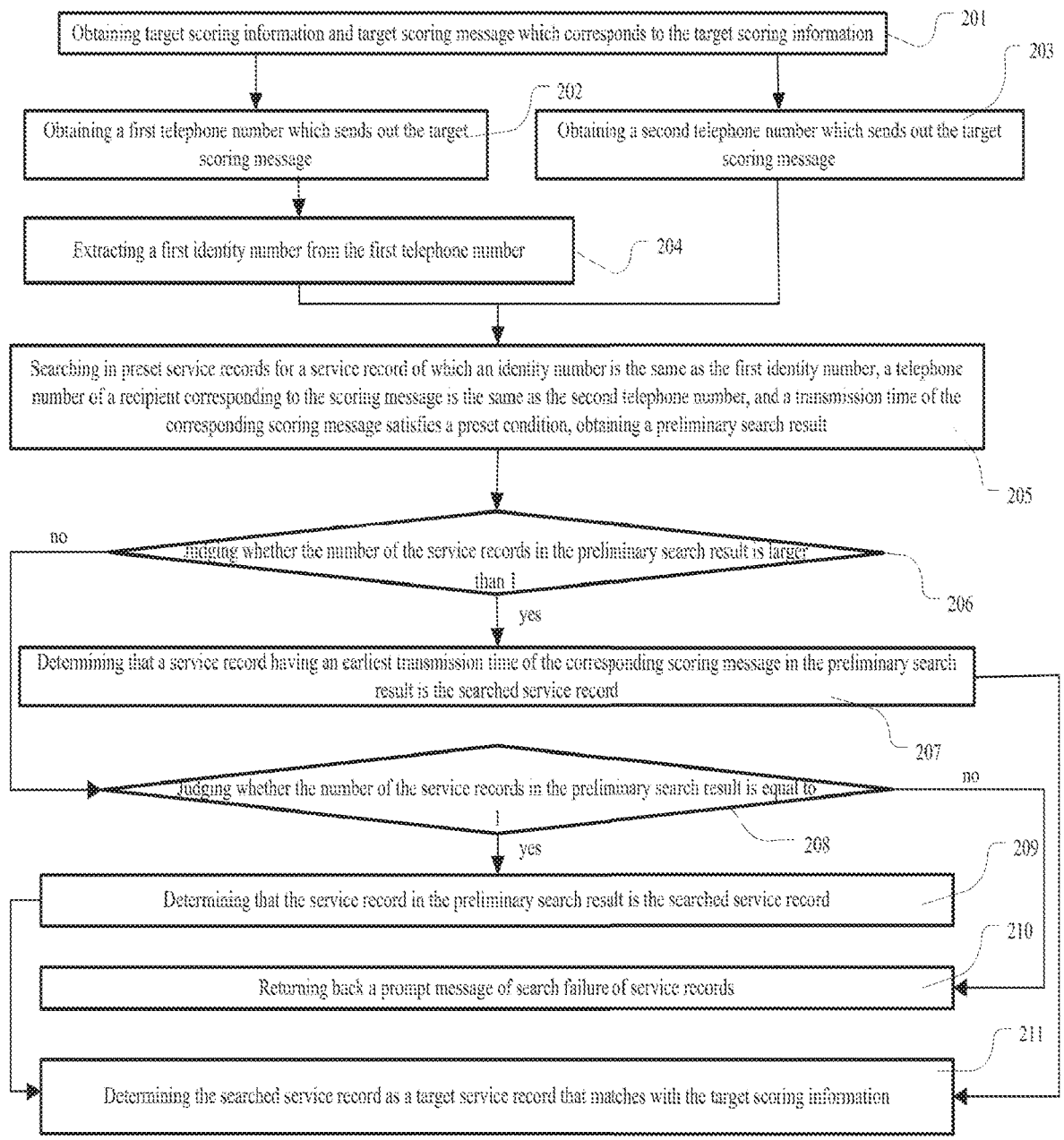
FIG. 2 illustrates a flow chart of a second embodiment of the scoring information matching method in one embodiment of the present application.

For facilitating understanding, a scoring information matching method of the present application will be described in more detailed from another aspect below. Please refer to FIG. 2, a second embodiment of the scoring information matching method in the embodiments of the present application comprises:

Step 201, obtaining target scoring information and target scoring message which corresponds to the target scoring information;

in this embodiment, firstly, the target scoring information and the target scoring message which corresponds to the target scoring information can be obtained.

The target scoring information can be the scoring information which is replied by a customer in response to the target scoring information. It can be understood that, when the customer replies the message information in response to a scoring message, the scoring information will be sent back to a telephone number which transmits the scoring information; thus, a system can obtain the target scoring information and the corresponding target scoring message directly.

Step 202, obtaining a first telephone number which sends out the target scoring information;

after the target scoring message is obtained, the first telephone number which sends out the target scoring information can be obtained.

The aforesaid first telephone number is referred to as the telephone number which sends out the target scoring message. It can be understood that, these telephone numbers which send out scoring messages are set according to a predetermined rule. For example, supposing that an official number provided by a telecom operator to an enterprise is 22222, regarding the telephone number which sends out the scoring message actually, 3 identity numbers subsequent to the number 22222 can be added in order to distinguish business data or index service records; then, the telephone number segment which sends out the scoring message is 22222XXX. It can be known that, the number of 22222XXX can distinguish 1000 scoring messages simultaneously at most, when there are more than 1000 scoring messages, a condition that the same telephone number sends out more than two scoring messages will occur.

Step 203, obtaining a second telephone number which sends out the target scoring information;

after the target scoring information is obtained, the second telephone number which sends out the target scoring information can be obtained, the second telephone number is the telephone number of the customer which sends out the target scoring information.

Step 204, extracting a first identity number from the first telephone number;

after the first telephone number is obtained, the first identity number in the first telephone number can be extracted.

It can be understood that, before sending out the target scoring information, the first telephone number will embed an identity number of a service record into the first telephone number; for example, supposing that the telephone number which sends out the scoring information is 22222XXX, the last three digits "XXX" is a location where the identity number of the service record is embedded. After the identity number in the telephone number which sends out the scoring message is extracted, the corresponding service record can be searched according to the identity number.

In one embodiment, for facilitating searching of the service records, the last three digits of an ID number of a service record can be selected as the identity number of the service record.

Step 205, searching in the preset service records for the service record of which an identity number is the same as the first identity number, and a telephone number of a recipient of the corresponding scoring message is the same as the second telephone number, and obtaining a preliminary search result;

after the first identity number and the second telephone number are obtained, the service record of which the identity number is the same as the second telephone number, and the telephone number of the recipient of the corresponding scoring message is the same as the second telephone number can be searched from the preset service records, and the preliminary search result can be obtained.

It can be understood that, since there is limited number of digits used for distinguishing business data or indexing identity number in the service record in the telephone number which sends out the scoring message; for example, supposing that the telephone number segment which sends out the scoring message is 22222XXX, this telephone number segment can distinguish 2000 scoring message simultaneously at most; when there are more than 2000 scoring messages, a condition that the same telephone number sends out more than two scoring messages will occur; thus, if the service record of which the identity number is the same as the first identity number, and the telephone number of the recipient of the corresponding scoring message is the same as the second telephone number is searched in the preset service records merely, more than two service records that meet the requirement may be obtained; at this time, a condition that the target scoring information is matched with a wrong service record may occur. Therefore, the preliminary search result may include more than two service records.

Step 206, judging whether the number of the service records in the preliminary search result is larger than 1, if the number of the service records in the preliminary search result is larger than 1, executing a step 207; otherwise, executing a step 208;

after the preliminary search result is obtained, whether the number of the service records in the preliminary search result is larger than 1 can be judged; if the number of the service records in the preliminary search result is larger than 1, the step 207 is executed, if the number of the service records in the preliminary search result is not larger than 1, the step 208 is executed.

Step 207, determining that the service record having an earliest transmission time of the corresponding scoring message in the preliminary search result as the searched service record;

If the number of the service records in the preliminary search result is larger than 1, the service record having the earliest transmission time of the corresponding scoring message in the preliminary search result can be determined as the searched service record.

In the second embodiment of the present application, the preset condition which needs to be satisfied by the transmission time of the scoring message in the first embodiment above is that: the transmission time of the corresponding scoring message is required to be the earliest. The transmission time can be, more particularly, sorting the service records in the preliminary search result according to transmission time of the scoring messages and in an ascending order, and then selecting the service record in the first order as the searched service record; that is, selecting the corresponding service record which sends out the scoring message earliest as the service record that needs to be matched currently.

Step 208, judging whether the number of the service records in the preliminary search result is equal to 1, if yes, executing a step 209, if no, executing a step 210;

if the number of the service records in the preliminary search result is not larger than 1, whether the number of the service records in the preliminary search result is equal to 1 can be judged, if yes, executing the step 209, if no, executing the step 210.

Step 209, determining that the service record in the preliminary search result is the searched service record;

If the number of the service records in the preliminary search result is equal to 1, the service record in the preliminary search result can be determined as the searched service record. It can be understood that, when the number of the service record in the preliminary search result is 1, there is no possibility of mismatch; thus, the service record in the preliminary search result can be determined as the searched service record directly.

Step 210, returning back a prompt message of a search failure of service record;

if the number of the service record in the preliminary search result is 0, the prompt message of search failure of service record is returned back.

Step 211, determining the searched service record as the target service record that matches with the target scoring information.

After the searched service record is determined, the searched service record can be determined as the target service record that matches with the target scoring information.

It can be understood that, after filtrating layer by layer according to the search conditions in the aforesaid steps 205-210, the searched service record can be considered as being corresponding to and matching with the target scoring information solely, and thus can be determined as the target service record.

Figure 3:
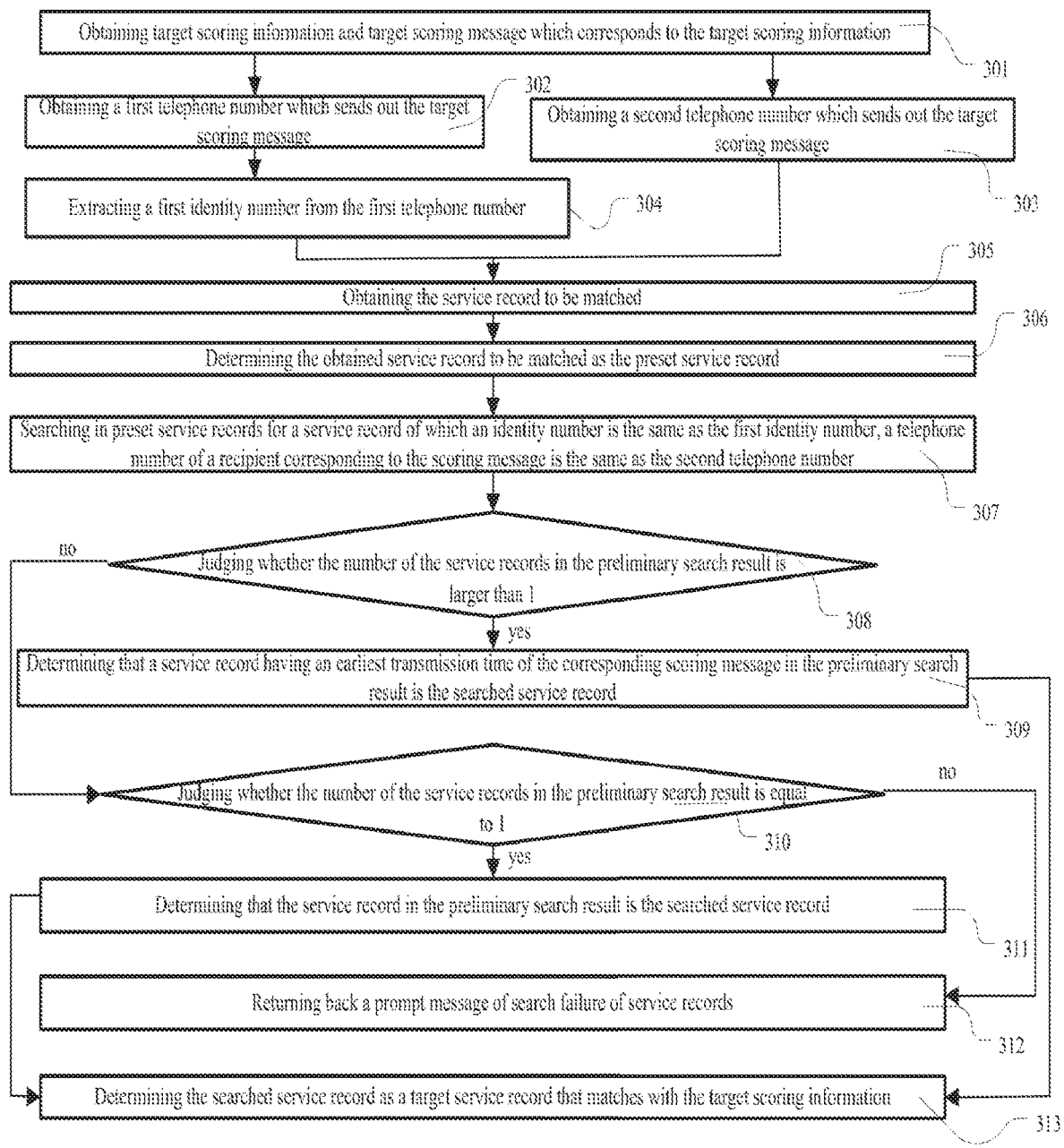
FIG. 3 illustrates a flow chart of a third embodiment of the scoring information matching method in one embodiment of the present application.

The present application are described mainly in the aspect of how to filtrate service record according to the transmission time of the scoring message above, the scoring information matching method in the present application will be described in detail in another aspect below; please refer to FIG. 3, a third embodiment of the scoring information matching method in the embodiments of the present application comprises:

step 301, obtaining target scoring information and a target scoring message which corresponds to the target scoring information;

in this embodiment, firstly, the target scoring information and the target scoring message which corresponds to the target scoring information are obtained.

The target scoring information can be scoring information which is replied by a customer in response to the target scoring information. It can be understood that, when the customer replies the message information in response to a scoring message, the scoring information will be sent back to a telephone number which transmits the scoring information; thus, a system can obtain the target scoring information and the corresponding target scoring message directly.

Step 302, obtaining a first telephone number which sends out the target scoring information;

after the target scoring message is obtained, the first telephone number which sends out the target scoring information can be obtained.

The aforesaid first telephone number is referred to as the telephone number which sends out the target scoring message. It can be understood that, these telephone numbers which send out scoring messages are set according to a predetermined rule. For example, supposing that an official number provided by a telecom operator to an enterprise is 22222, regarding the telephone number which sends out the scoring message actually, 3 identity numbers subsequent to the number 22222 can be added in order to distinguish business data or index service records; then, the telephone number segment which sends out the scoring message is 22222XXX. It can be known that, the number of 22222XXX can distinguish 3000 scoring messages simultaneously at most, when there are more than 3000 scoring messages, a condition that the same telephone number sends out more than two scoring messages will occur.

Step 303, obtaining a second telephone number which sends out the target scoring information;

after the target scoring information is obtained, the second telephone number which sends out the target scoring information can be obtained, the second telephone number is the telephone number of the customer which sends out the target scoring information.

Step 304, extracting a first identity number from the first telephone number;

after the first telephone number is obtained, the first identity number in the first telephone number can be extracted.

It can be understood that, before sending out the target scoring information, the first telephone number will embed an identity number of a service record into the first telephone number; for example, supposing that the telephone number which sends out the scoring information is 22222XXX, the last three digits "XXX" is a location where the identity number of the service record is embedded. After the identity number in the telephone number which sends out the scoring message is extracted, the corresponding service record can be searched according to the identity number.

In one embodiment, for facilitating searching of the service records, the last three digits of an ID number of a service record can be selected as the identity number of the service record.

Step 305, obtaining the service record to be matched;

in this embodiment, before searching for the service record that meets the preset condition, the service record to be matched can also be obtained. The aforesaid service record to be matched is referred to as the service record that doesn't match with the scoring information, such that the service record to be matched can be obtained in a database which stores all service records.

It can be understood that, as for the service records, generally, a scoring can be performed once for one service record merely, thus, the service record that has been matched with scoring information are out of a search range, these service records having scores can be filtrated according to the step 305.

Further, in this embodiment, the scoring information matching method can further comprises: judging whether the transmission time of the scoring message corresponding to the service record to be matched has exceeded the time threshold, if yes, matching the service record to be matched with a preset default scoring information.

It can be understood that, considering that some customers may not reply to the received scoring messages for long time, and then reply to a plurality of scoring messages accumulated in a time period all at once, a time span of these accumulated scoring messages may be very wide, such as a few months, a condition that there are scoring messages from the same number in these scoring messages is prone to occur, and thus a correct matching of service record is prone to be disturbed and affected. Therefore, furthermore, an automatic scoring can be performed for the service record corresponding to the scoring message the transmission time of which exceeds the preset time threshold, for example, if a scoring reply is not received 48 hours after the scoring message is sent out, a system can perform an automatic scoring for the service record corresponding to the scoring message, and assign a matched preset default scoring information for the scoring message, thereby filtrating these old service records that may cause interference easily.

Step 306, determining the obtained service record to be matched as the preset service record;

Step 307, searching for the service record of which an identity number is the same as the first identity number, and a telephone number of a recipient of the corresponding scoring message is the same as the second telephone number, thereby obtaining a preliminary search result;

after the first identity number and the second telephone number are obtained, the service record of which the identity number is the same as the second telephone number, and the telephone number of the recipient of the corresponding scoring message is the same as the second telephone number can be obtained in the preset service records, and the preliminary search result can be obtained.

It can be understood that, since there is limited number of digits used for distinguishing business data or indexing identity number in the service record in the telephone number which sends out the scoring message, for example, supposing that the telephone number segment which sends out the scoring message is 22222XXX, this telephone number segment can distinguish 3000 scoring message simultaneously at most; when there are more than 3000 scoring messages, a condition that the same telephone number sends out more than two scoring messages will occur; thus, if the service record of which the identity number is the same as the first identity number, and the telephone number of the recipient of the corresponding scoring message is the same as the second telephone number is searched in the preset service records merely, more than two service records that meet the requirement may be obtained; at this time, a condition that the target scoring information is matched with a wrong service record may occur. Therefore, the preliminary search result may include more than two service records.

Step 308, judging whether the number of the service records in the preliminary search result is larger than 1, if the number of the service records in the preliminary search result is larger than 1, executing a step 309; otherwise, executing a step 310;

after the preliminary search result is obtained, whether the number of the service records in the preliminary search result is larger than 1 can be judged; if the number of the service records in the preliminary search result is larger than 1, the step 309 is executed, if the number of the service records in the preliminary search result is not larger than 1, the step 310 is executed.

Step 309, determining that the service record having an earliest transmission time of the corresponding scoring message in the preliminary search result as the searched service record;

If the number of the service records in the preliminary search result is larger than 1, the service record having the earliest transmission time of the corresponding scoring message in the preliminary search result can be determined as the searched service record.

In the third embodiment of the present application, the preset condition which needs to be satisfied by the transmission time of the scoring message in the first embodiment above is that: the transmission time of the corresponding scoring message is required to be the earliest. The transmission time can be, more particularly, sorting the service records in the preliminary search result according to transmission time of the scoring messages and in an ascending order, and then selecting the service record in the first order as the searched service record; that is, selecting the corresponding service record which sends out the scoring message earliest as the service record that needs to be matched currently.

Step 310, judging whether the number of the service records in the preliminary search result is equal to 1, if yes, executing a step 311, if no, executing a step 312;

if the number of the service records in the preliminary search result is not larger than 1, whether the number of the service records in the preliminary search result is equal to 1 can be judged, if yes, executing the step 311, if no, executing the step 312.

Step 311, determining that the service record in the preliminary search result is the searched service record;

If the number of the service records in the preliminary search result is equal to 1, the service record in the preliminary search result can be determined as the searched service record. It can be understood that, when the number of the service record in the preliminary search result is 1, there is no possibility of mismatch; thus, the service record in the preliminary search result can be determined as the searched service record directly.

Step 312, returning back a prompt message of a search failure of service record;

if the number of the service record in the preliminary search result is 0, the prompt message of search failure of service record is returned back.

Step 313, determining the searched service record as the target service record that matches with the target scoring information.

After the searched service record is determined, the searched service record can be determined as the target service record that matches with the target scoring information.

It can be understood that, after filtrating layer by layer according to the search conditions in the aforesaid steps 307-312, the searched service record can be considered as being corresponding to and matching with the target scoring information solely, and thus can be determined as the target service record.

Figure 4:
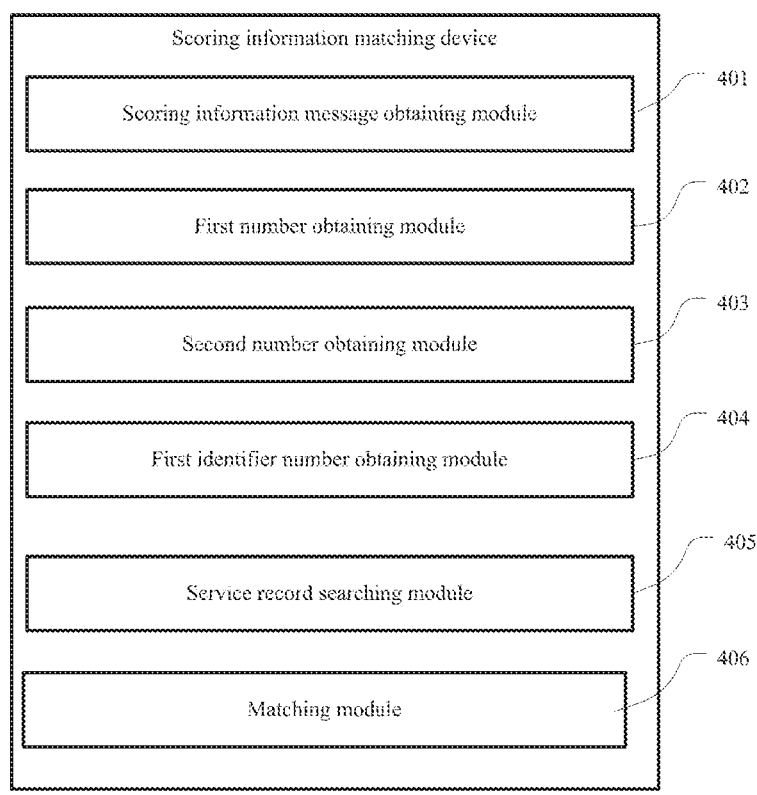
FIG. 4 illustrates a structural view of a first embodiment of a scoring information matching device in one embodiment of the present application.

A scoring information matching method are described mainly above, a scoring information matching device will be described in detail below:

FIG. 4 illustrates a structural view of a first embodiment of the scoring information matching device in the embodiments of the present application.

In this embodiment, the scoring information matching device comprises:

a scoring information message obtaining module 401 configured to obtain target scoring information and target scoring message which corresponds to the target scoring information;

a first number obtaining module 402 configured to obtain a first telephone number which sends out the target scoring message;

a second number obtaining module 403 configured to obtain the second telephone number which sends out the target scoring information;

a first identifier number obtaining module 404 configured to extract a first identity number from the first telephone number;

a service record searching module 405 configured to search in preset service records for a service record of which an identity number is the same as the first identity number, a telephone number of a recipient of a corresponding scoring message is the same as the second telephone number, and a transmission time of the corresponding scoring message satisfies a preset condition; and a matching module configured 406 to determine the searched service record as a target service record that matches with the target scoring information.

Figure 5:
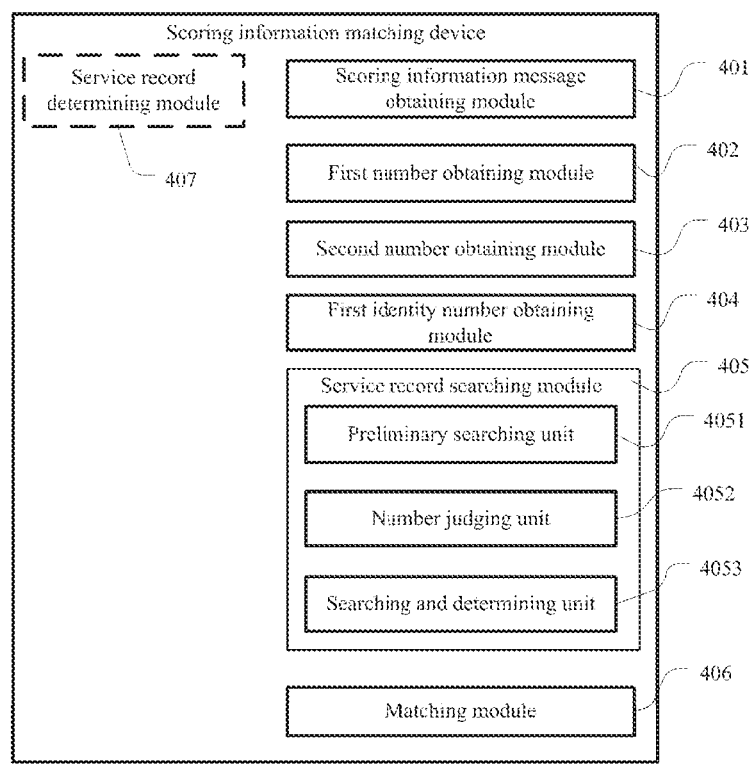
FIG. 5 illustrates a structural view of a second embodiment of the scoring information matching device in the embodiments of the present application.

FIG. 5 illustrates a structural view of a second embodiment of the scoring information matching device in the embodiments of the present application.

As shown in FIG. 5, more particularly, the service record searching module 405 can further comprise:

a preliminary searching unit 4051 configured to search for the service record of which the identity number is the same as the first identity number, and the telephone number of the recipient of the corresponding scoring message is the same as the second telephone number in the preset service records, thereby obtaining a preliminary search result;

a number judging unit 4052 configured to judge whether the number of the service records in the preliminary search result is larger than 1; and a searching and determining unit 4053 configured to determine that a service record having an earliest transmission time of the corresponding scoring message in the preliminary search result is the searched service record if the number of the service records in the preliminary result is larger than 1.

Furthermore, the scoring information matching device can further comprise:

a service record determining module 407 configured to determine that the service record in the preliminary search result is the searched service record if the number of the service record in the preliminary search result is equal to 1.

Figure 6:
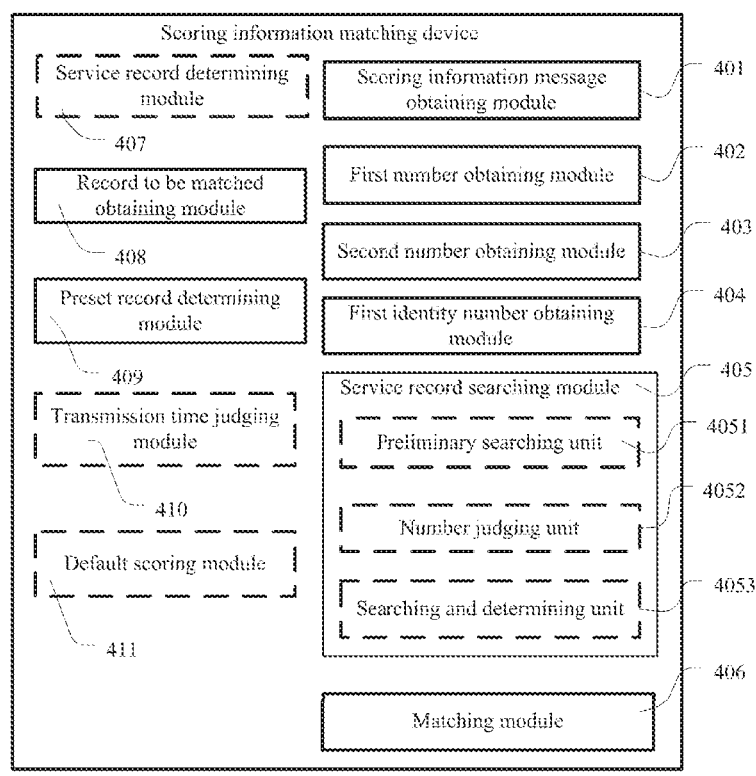
FIG. 6 illustrates a structural view of a third embodiment of the scoring information matching device in one embodiment of the present application.

FIG. 6 illustrates a structural view of a third embodiment of the scoring information matching device in the embodiments of the present application.

As shown in FIG. 6, more particularly, the scoring information matching device can further comprise:

a record to be matched obtaining module 408 configured to obtain the service records to be matched; and a preset record determining module 409 configured to determine the obtained service records to be matched as the preset service records.

Furthermore, the scoring information matching device can further comprise:

a transmission time judging module 410 configured to judge whether the transmission time of the scoring message which corresponds to the service records to be matched exceeds a preset time threshold; and a default scoring module 411 configured to match the service records to be matched with the preset default scoring information if the transmission time judging module 410 judges that the transmission time of the scoring information which corresponds to the service records to be matched exceeds the preset time threshold.

Figure 7:
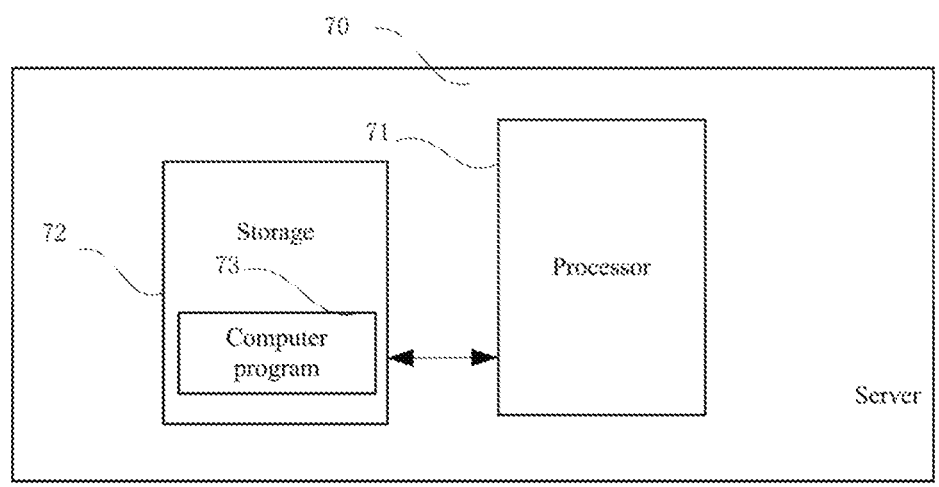
FIG. 7 illustrates a schematic view of a server provided by one embodiment of the present application.

FIG. 7 illustrates a schematic view of a server 7 provided by one embodiment of the present application. As shown in FIG. 7, the server 7 of the present application comprises a processor 70, a storage device 71, and computer program 72 stored in the storage device 71 and executable by the processor 70, such as the program that is configured to execute the scoring information matching method. The processor 70 is configured to implement the steps in the various embodiments of the scoring information matching method when executing the computer program 72, such as steps 101-106 shown in FIG. 1. Or alternatively, the processor 70 is configured to implement functionalities of various modules/units in the aforesaid device embodiments, such as the modules 401-406 shown in FIG. 4.

Illustratively, the computer program 72 can be divided into one or more modules/units, the one or more modules/units are stored in the storage device 71, and are executed by the processor 30 so as to implement the present application. The one or more modules/units can be a series of computer program instruction segments that can implement specific functionalities, these instruction segments are used for describing an executive process of the computer program 72 in the server 7.

The server 7 can be a computing device such as a local server, a cloud server, etc. The server 7 can include but is not limited to the processor 70, the storage device 71. It can be understood by one of ordinary skill in the art that, FIG. 7 is an example of the server 7 merely, but should not be regarded as limitation to the server 7, the server 7 can include components more or less than the components shown in the figures, or some components can be combined, or different components can be combined; for example, the server can also include an input and output device, a network access device, a bus, etc.

The processor 70 can be a CPU (Central Processing Unit), and can also be other general purpose processor, DSP (Digital Signal Processor), ASIC (Application Specific Integrated Circuit), FGPA (Field-Programmable Gate Array), or be some other programmable logic devices, discrete gate or transistor logic devices, discrete hardware components, etc. The general purpose processor can be a MCU (Micro Processing Unit), or alternatively, the processor can also be any conventional processor, etc.

The storage device 71 can be an internal storage unit of the server 7, such as a hard disk or a memory of the server 7. The storage device 71 can also be an external storage device of the server 7, such as a plug-in hard disk, a SMC (Smart Media Card), a SD (Secure Digital) card, a FC (Flash Card) equipped on the server 7. Furthermore, the storage device 31 may include both the internal storage unit and the external storage device of the server 3, either. The storage device 71 is configured to store the computer programs, and other procedures and data needed by the server 7. The storage device 71 can also be configured to store data that has been output or being ready to be output temporarily.

It will be apparent to those skilled in the art that for the convenience and simplicity of the description, the corresponding processes of the method embodiment described earlier on can be referred to for the specific operating processes of the above system, device, and units, which so won't be detailed again.

It should be understood that the systems, the device, and the method disclosed in several embodiments provided herein may also be implemented in other ways. For example, the device embodiment described is merely illustrative. For example, the division of units is merely a division by logical functions, so there may exist other ways of division in actual implementations, e.g., multiple units or components may be combined or be integrated into another system, or some features can be omitted, or not performed. In another aspect, the couplings, direct couplings, or communication connections shown or discussed may be indirect couplings or communication connections through some interfaces, devices or units, and may be electrical, mechanical, or in other forms.

Separate units as illustrated may or may not be physically separate. Components or parts illustrated as units may or may not be physical units, and may reside at one location or may be distributed over multiple networked units. Some or all of the units may be selectively adopted according to actual requirements to achieve objectives of embodiments of the disclosure.

Various functional units described in various embodiments herein may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portions that contribute to the prior art, or part of the technical solution, of the disclosure may be embodied as software products. Computer software products can be stored in a storage medium and can include multiple instructions that, when executed, cause a computing device, e.g., a personal computer, a server, a network device, etc., to execute some or all steps of the methods as described in various embodiments. The above storage medium may include various kinds of media that can store program code, such as a USB flash disk, a mobile hard drive, a read-only memory (ROM), a random access memory (RAM), a magnetic disk, an optical disc, or the like.

As stated above, the aforesaid embodiments are only intended to explain but not to limit the technical solutions of the present application. Although the present application has been explained in detail with reference to the above-described embodiments, it should be understood for one of ordinary skill in the art that, the technical solutions described in each of the above-described embodiments can still be amended, or some technical features in the technical solutions can be replaced equivalently; these amendments or equivalent replacements won't make the essential of corresponding technical solution to break away from the spirit and the scope of the technical solution in various embodiments of the present application.

What is claimed is:

1. A method for obtaining an accurate target service record in a database of service records, comprising:
   obtaining a first electronic target scoring message which corresponds to a first telephone number and includes first target scoring information, wherein the first telephone number comprises a first identity number;
   storing the first target scoring information and first telephone number in a first record of the database of service records;
   obtaining a second electronic target scoring message which corresponds to a second telephone number and includes second target scoring information, wherein the second telephone number comprises a second identity number, and wherein the first identity number and the second identity number can be the same;
   storing the second target scoring information and second telephone number in a second record of the database of service records;
   extracting the first identity number from the first telephone number;
   searching the database of service records for a service record which includes the first identity number and the second telephone number, thereby obtaining a searched service record;
   determining that a transmission time of an electronic target scoring message corresponding to the searched service record satisfies a preset condition; and
   determining that the searched service record is the target service record that matches with the first target scoring information.

2. The method according to claim 1, further comprising the steps of:
   obtaining a preliminary search result comprising a plurality of searched service records;
   judging whether the number of the service records in the preliminary search result is larger than 1; and
   determining that a service record in the preliminary search result satisfies the preset condition if the corresponding electronic target scoring message has an earliest transmission time if the number of service records in the preliminary result is larger than 1.

3. The scoring information matching method according to claim 2, further comprising:
   determining that the service record in the preliminary search result is the searched service record if the number of the service records in the preliminary search result is equal to 1.

4. The scoring information matching method according to claim 1, wherein before searching in the database of service records, the method further comprises:
   obtaining the service records to be matched; and
   determining the obtained service records to be matched as the database of service records.

5. The scoring information matching method according to claim 4, further comprising:
   judging whether the transmission time of the scoring message corresponding to the searched service record exceeds a preset time threshold; and
   determining that a service record satisfies the preset condition if the transmission time of the electronic target scoring message which corresponds to the service record exceeds the preset time threshold.

6. A scoring information matching device for use in obtaining an accurate target service record in a database of service records, comprising:
   a scoring information message obtaining module configured to obtain a first electronic target scoring message which corresponds to a first telephone number and includes first target scoring information, wherein the first telephone number comprises a first identity number, and for obtaining a second electronic target scoring message which corresponds to a second telephone number and includes second target scoring information, wherein the second telephone number comprises a second identity number, and wherein the first identity number and the second identity number can be the same;
   memory in communication with the scoring information message obtaining module configured to store the first target scoring information and first telephone number in a first record of the database of service records and to store the second target scoring information and second telephone number in a second record of the database of service records;
   a first identifier number obtaining module configured to extract a first identity number from the first telephone number;
   a service record searching module configured to search for a service record of the database of service records which includes the first identity number and the second telephone number to obtain a searched service record and determine that a transmission time of an electronic target scoring message corresponding to the searched service record satisfies a preset condition; and
   a matching module configured to determine that the searched service record is the target service record that matches with first the target scoring information.

7. The scoring information matching device according to claim 6, wherein the service record searching module particularly comprises:
   a preliminary searching unit configured to search in the database of service records for the service record of which the identity number is the same with the first identity number, and the telephone number of the recipient of the corresponding scoring message is the same as the second telephone number, thereby obtaining a preliminary search result;
   a number judging unit configured to judge whether the number of the service records in the preliminary search result is larger than 1; and
   a searching and determining unit configured to determine that a service record satisfies the preset condition if the corresponding scoring message in the preliminary search result has an earliest transmission time.

8. The scoring information matching device according to claim 7, further comprising:
   a service record determining module configured to determine that the service record in the preliminary search result is the searched service record if the number of the service records in the preliminary search result is equal to 1.

9. The scoring information matching device according to claim 6, further comprising:
   a record to be matched obtaining module configured to obtain the service records to be matched; and
   a preset record determining module configured to determine the obtained service records to be matched as the database of service records.

10. The scoring information matching device according to claim 9, further comprising:
- a transmission time judging module configured to judge whether the transmission time of the scoring message which corresponds to the searched service record exceeds a preset time threshold; and
- a default scoring module configured to determine that a service record satisfies the preset condition if the transmission time of the electronic target scoring message which corresponds to the service records to be matched exceeds the preset time threshold.

11. A server comprising a storage device, a processor and computer program stored in the storage device and executable by the processor, wherein the processor is configured to implement following steps when executing the computer program:
- obtaining a first electronic target scoring message which corresponds to a first telephone number and includes first target scoring information, wherein the first telephone number comprises a first identity number;
- storing the first target scoring information and first telephone number in a first record of a database of service records in the storage device;
- obtaining a second electronic target scoring message which corresponds to a second telephone number and includes second target scoring information, wherein the second telephone number comprises a second identity number, wherein the first identity number and the second identity number can be the same;
- storing the second target scoring information and second telephone number in a second record of the database of service records;
- extracting the first identity number from the first telephone number;
- searching the database of service records for a service record which includes the first identity number and the second telephone number, thereby obtaining a searched service record;
- determining that a transmission time of an electronic target scoring message corresponding to the searched service record satisfies a preset condition; and
- determining that the searched service record is the target service record that matches with the first target scoring information.

12. The server according to claim 11, wherein the processor is configured to implement the following further steps when executing the computer program:
- obtaining a preliminary search result comprising a plurality of searched service records;
- judging whether the number of the service records in the preliminary search result is larger than 1; and
- determining that a service record satisfies the preset condition if the corresponding electronic target scoring message in the preliminary search result has an earliest transmission time.

13. The server according to claim 12, wherein the processor is configured to implement the following further steps when executing the computer program:
- determining that the service record in the preliminary search result is the searched service record if the number of the service record in the preliminary search result is equal to 1.

14. The server according to claim 11, wherein before searching for a service record, the processor is configured to implement the following further steps when executing the computer program:
- obtaining the service records to be matched; and
- determining the obtained service records to be matched as the database of service records.

15. The server according to claim 14, wherein the processor is configured to implement the following further steps when executing the computer program:
- judging whether the transmission time of the scoring message corresponding to the searched service record exceeds a preset time threshold; and
- determining that a service record satisfies the preset condition if the transmission time of the electronic target scoring message which corresponds to the service record exceeds the preset time threshold.

* * * * *